March 6, 1945.　　　　J. M. CARTER　　　　2,370,716
WELDING APPARATUS
Filed Dec. 6, 1943　　　3 Sheets-Sheet 1
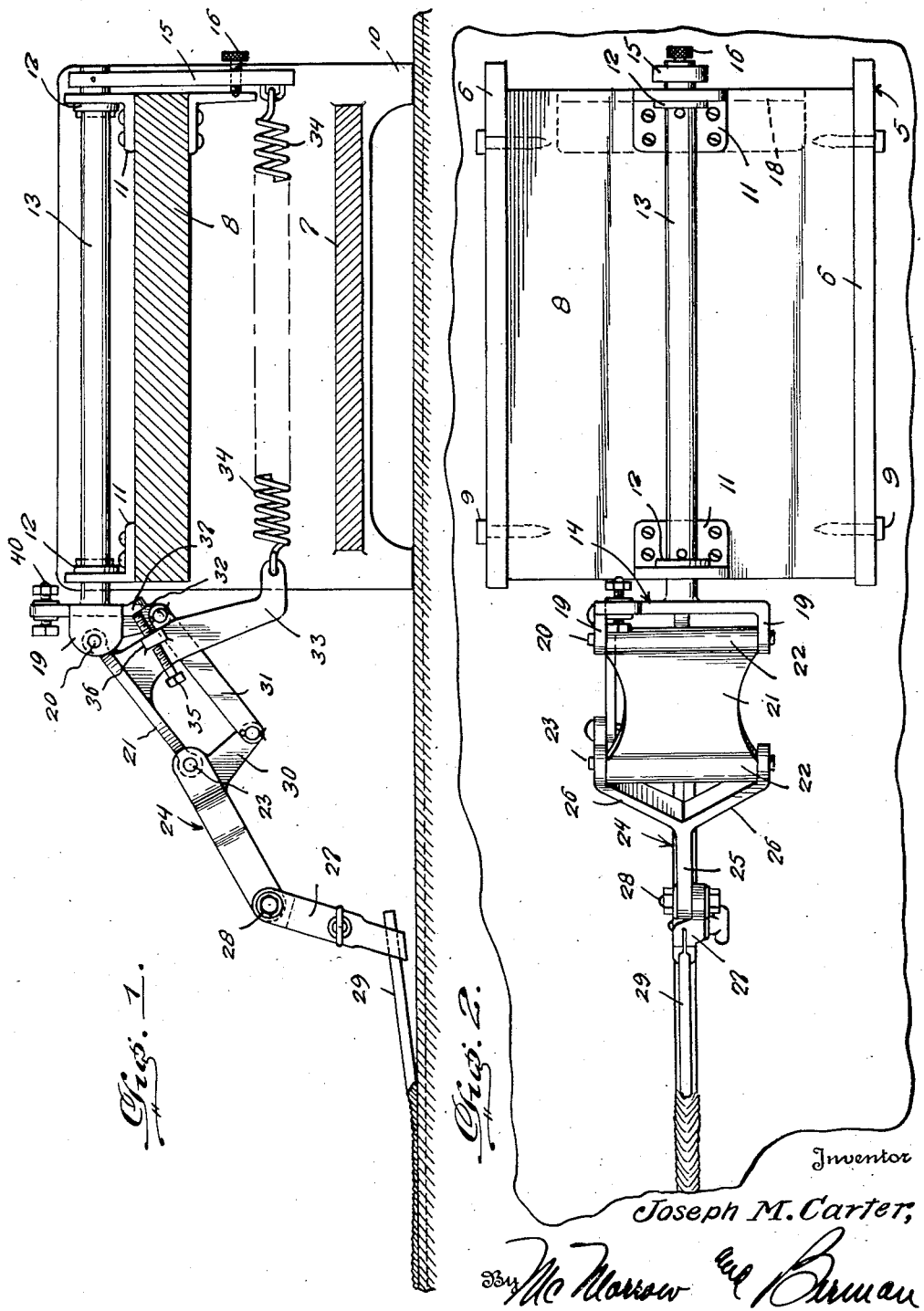
Inventor
Joseph M. Carter,

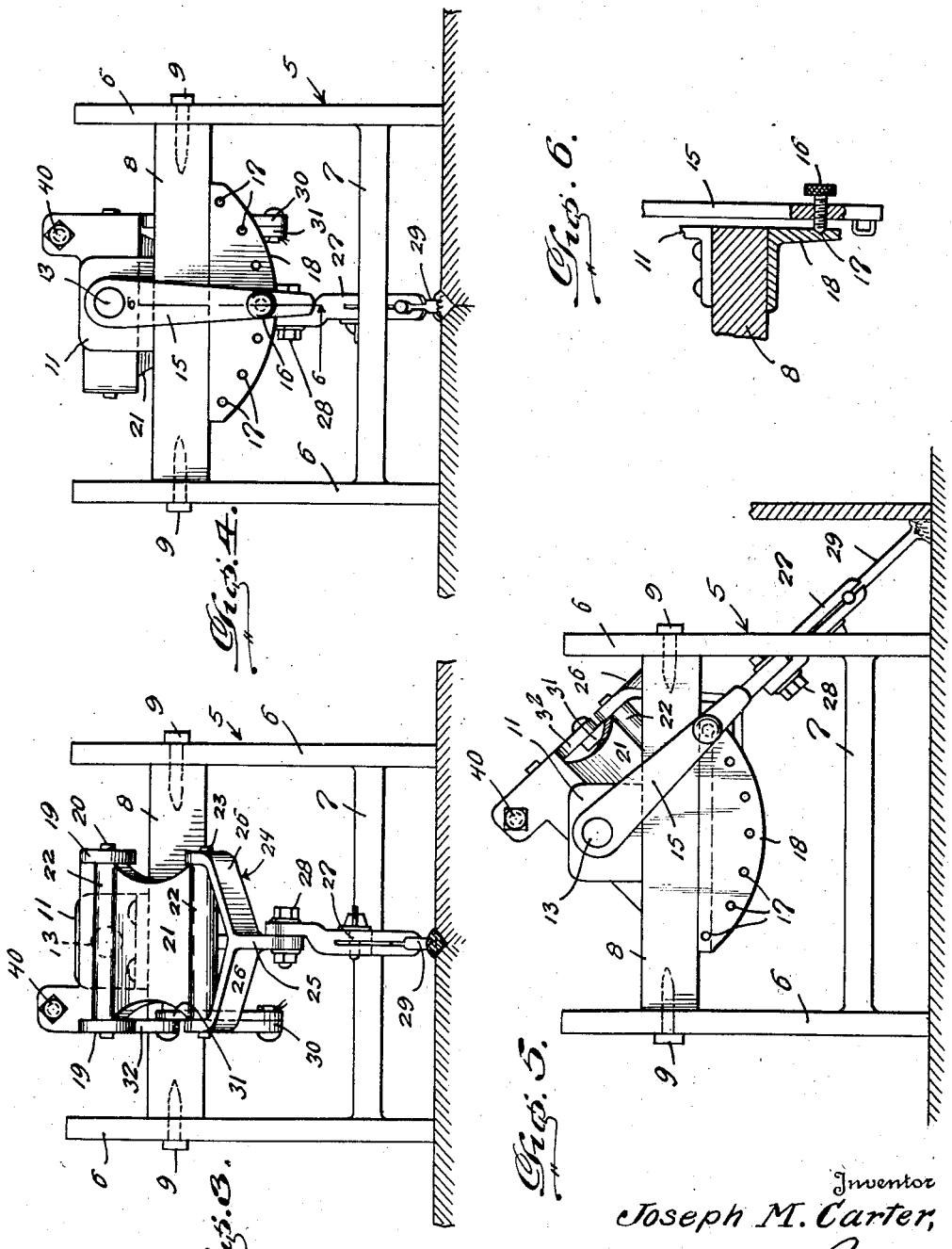

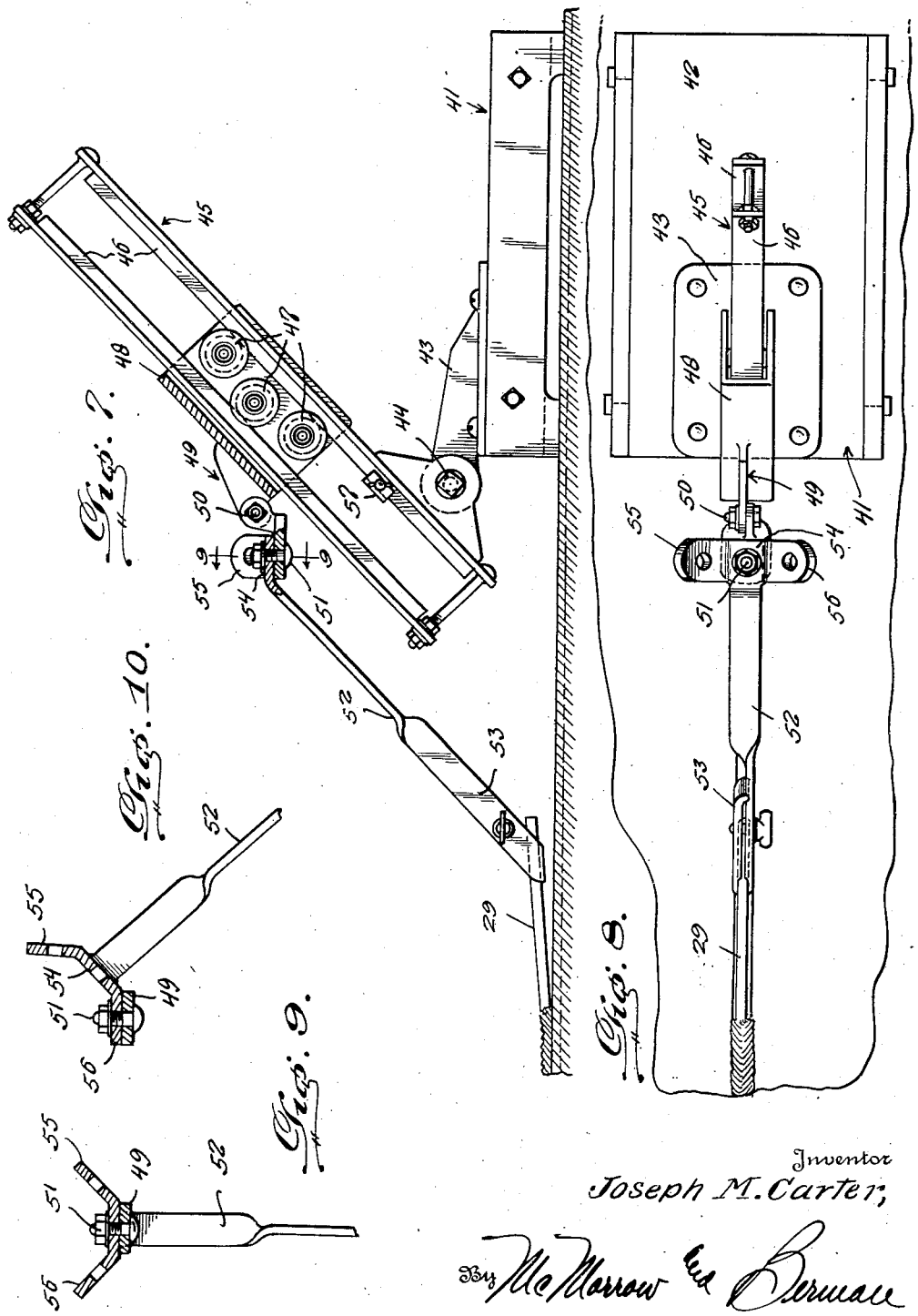

Patented Mar. 6, 1945

2,370,716

UNITED STATES PATENT OFFICE 2,370,716

WELDING APPARATUS

Joseph M. Carter, Baltimore, Md.

Application December 6, 1943, Serial No. 513,103

4 Claims. (Cl. 219—8)

This invention relates to a welding apparatus for seam welding and more particularly to a welding electrode holder especially adapted for automatically carrying out a welding operation with a conventional welding stick or electrode after the device has been once manually arranged for the particular or selected kind of weld desired.

The primary object of the invention is the provision of a device which may be easily and quickly set for making a selected kind of weld and placed in operation so that further manual attention thereto will not be required during the entire welding operation, the device being provided with means for automatically stopping the welding operation when the weld is completed by said device.

Another object of the invention is the provision of a device of the above stated character which may be conveniently handled or moved from place to place and is of a simple, compact and durable construction and may be manufactured and sold at a low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation, partly in section, illustrating a welding apparatus constructed in accordance with my invention.

Figure 2 is a top plan view illustrating the device.

Figure 3 is a front end view illustrating the device.

Figure 4 is a rear end view illustrating the device.

Figure 5 is a rear end view showing the device adjusted for making a fillet type weld.

Figure 6 is a detail sectional view taken on the line 6—6 of Figure 4.

Figure 7 is a side elevation, partly in section, illustrating a modified form of my invention.

Figure 8 is a top plan view illustrating the modified form of the invention.

Figure 9 is a detail sectional view taken on the line 9—9 of Figure 7.

Figure 10 is a view similar to Figure 9 showing the arm adjusted for making a fillet type weld.

Referring in detail to the drawings, the numeral 5 indicates a support, consisting of substantially rectangular shaped spaced plates 6 connected by a brace 7 and to which is secured a bed plate 8 of insulating material. The bed plate is arranged between the side plates 6 being suitably secured thereto, as shown at 9, and in a plane below the upper edges of the side plates. The brace 7 may be welded or otherwise secured to the side plates and the latter have the lower edges thereof cut away to form feet 10 for evenly supporting the frame on the work to be welded.

Brackets 11 are secured to the bed plate 8 and provide journals 12 for a shaft 13 arranged horizontally over the bed plate and has integral with one end thereof a forked type head 14 and the opposite end has secured thereto a lever 15 for the manual rotation of the shaft in either direction. A set screw 16 is carried by the hand lever to engage in any one of a series of openings 17 formed in a keeper 18 secured to the bed plate whereby the shaft 13 may be adjusted and secured in any of its adjusted positions. The forked head of the shaft 13 is arranged slightly forwardly of the front end of the support and provides spaced ears 19 apertured to receive a pivot pin 20. A link type plate 21 has its ends rolled to form barrels 22, one of which receives the pivot pin 20 between the ears 19 and the other receives a pivot pin 23 carried by a substantially Y shaped arm 24 including a stem portion 25 and converging arm portions 26 apertured to receive the pivot pin 23.

A clamp 27 is connected to the stem portion 25 by a bolt 28 providing means whereby the clamp may have its angular position with respect to the arm 24 varied. The clamp 27 is of such a construction that a conventional type of welding stick or electrode 29 may be adapted thereto.

Formed on one of the arm portions 26 of the arm 24 is an extension 30 to which is pivoted a link 31. The other end of the link is pivoted to an ear 32 formed on the head 14 of the shaft 13. An arm 33 is formed on the link or plate 21 and has one end of a coil spring 34 connected thereto. The other end of the coil spring is connected to the lever 15. The purpose of the coil spring is to place tension on the welding electrode against the work. The angle of inclination of the welding electrode with respect to the work can be easily varied by adjusting the angle of the clamp 27 on the arm 24. The arm 24 cooperates with the link 21 in providing a knee action between the shaft 13 and the welding electrode.

A set screw 35 is threaded to an ear 36 formed on the arm 33 and bears against a stop 37 forming a part of the head 14. The purpose of the set screw is for limiting the movement of the clamp 27 and arm 24 in the direction of the work and by adjusting the set screw in the ear 36 the limiting of the movement of the clamp and arm 24 toward the work can be varied.

A terminal bolt 40 is carried by the head 14 to permit one of the electric leads of an electric welding circuit to be connected to the head, it being understood that the other lead of the electric welding circuit is connected to the work.

The welding stick or electrode may be of any suitable type, such for example, as one coated with the well known welding flux.

In operation, the support is positioned on the work by a person and the welding electrode or stick is made to align with the joint or place to be welded with the end of the welding electrode or stick in contact with the work and with the welding electrode or stick supported in an angular position to the work and under tension by the spring 34. To facilitate the aligning of the electrode or stick with the place to be welded, the operator or person may sight downwardly through the V provided by the Y shaped arm 24. It is to be understood that the welding electrode or stick will be of an appropriate length for making the desired length of weld. With the device thus arranged on the work and as shown in Figures 1 and 2, the welding current is then turned on and the welding electrode or stick will progressively weld thus shortening the electrode or stick permitting the arm 24 and clamp to swing in the direction of the work and in this way the active end of the electrode stick will automatically move along the work to automatically form the weld. Long welds will take a relatively long electrode or stick, and shorter welds will take correspondingly short electrodes or sticks. The set screw coming in contact with the ear 37 will stop the progress of the weld also will prevent the clamp 27 from contacting the work and creating an arc which might damage the clamp.

The device described may be operated by a single workman and it will be further understood that the single workman by a plurality of such devices may take care thereof and thereby permit the workman to care for a number of welding operations at one time. Once the device is properly set and the current turned on, the active or free end of the welding electrode or stick will automatically move along the joint and the setting of the set screw will stop the movement of the electrode or stick at any predetermined position. This can be easily determined by attaching a dummy rod or electrode in the holder before the current is turned on.

With the lever positioned in a perpendicular position, as shown in Figure 4, the device will then be arranged for making a flat butt weld and by swinging the lever laterally of the depending position and securing the same in its lateral position the device is then arranged for making a fillet type weld, as shown in Figure 5.

The lever being movable laterally in either direction from a perpendicular position will permit the apparatus to make a fillet type weld on either side of the vertically arranged portion of the work.

Referring to the modified form of the invention shown in Figures 7 to 10, inclusive, the operation thereof is quite similar to the operation of the form of the invention shown in Figures 1 to 6 inclusive, except that the welding electrode or stick clamp is moved in the direction of the work as the welding electrode or stick burns by gravity action.

In the modified form of the invention, a support 41 of any selected weight is provided and includes an insulated bed plate 42 on which a bracket 43 is fastened. The bracket includes pivotally connected sections, the pivot being indicated by the character 44 and is in the form of a bolt whereby one section of the bracket may be adjusted relative to the other section. Carried by the bracket 43 is an elongated track assembly 45 consisting of spaced rails 46 engaged by rollers 47 of a carriage 48 whereby the carriage may slide in an endwise direction of the track assembly. The carriage 48 is of a construction to surround the track assembly and is spaced therefrom by the arrangement of the rollers 47 so that the carriage may move over the track assembly with a minimum amount of friction.

A sectional bracket 49 is secured to the carriage 48. The sections of the bracket 49 are connected by a bolt 50 whereby one section may be adjusted relative to the other section. One of the sections of the bracket 49 carries a bolt 51 employed for adjustably securing thereto an arm 52, a portion of which provides a clamp 53 for the welding electrode or stick. The mountable end of the arm 52 is shaped as shown in Figures 9 and 10 so as to provide portions 54, 55 and 56 all of which are apertured so that the bolt 51 may be extended therethrough for fastening the arm in various positions on the bracket 49 to permit the use of this device for making different types of welds, such as a fillet type weld or a flat butt weld. When making the latter-named type of weld the portion 54 is connected to one section of the bracket 49. The portions 55 or 56 are fastened to said section of the bracket 49 when making the fillet type weld.

Adjustably mounted on the track assembly 45 is a stop 57 for limiting the movement of the carriage toward the work. The stop may be adjusted endwise of the track assembly and thereby vary the distance in which the carriage may move toward the work and thus bring about a variable stopping of the welding operation of the device.

It will be seen as the welding electrode or stick melts away the carriage gravitates progressing the arm 52 to cause the welding electrode or stick to progress along the joint for forming the weld of determined length. The determined length of the weld is governed by the length of the welding electrode or stick employed and the positioning of the stop 57. Also it will be understood that the positioning of the stop 57 is such as to prevent the clamp end 53 of the arm from engaging the work and creating an arc.

One of the electric leads of the welding circuit may be connected to the track assembly or to a part of the arm 52 or to the connection employed for adjustably connecting the arm to the carriage.

While I have shown and described the preferred embodiment of my invention, it will be understood that minor changes in construction, combination and arrangement of parts may be made without departing from the spirit and scope of the invention as claimed.

Having thus described my invention, what I claim is:

1. In an apparatus of the class described, an arm including means for gripping a welding stick, a support, a track assembly pivotally mounted on said support and adjustable to assume different inclinations with respect to the work, and a carriage including rollers adapted to travel on said track assembly, and a transversely adjustable connection between the arm and the carriage.

2. In an apparatus of the class described, an arm including means for gripping a welding stick, a support, a track assembly pivotally mounted on said support and adjustable to assume different inclinations with respect to the work, a carriage including rollers adapted to travel on said track assembly, a transversely adjustable connection between the arm and the carriage, and a stop adjustably mounted on the track assembly for the carriage.

3. In an apparatus of the character described, a support to engage a piece of work to be welded, a track assembly adjustably mounted on the support to have its inclination varied with respect to the work, a carriage including rollers adapted to travel on the track assembly, a bracket secured to the carriage and including an adjustable section, an arm including means for gripping a welding stick and adjustably connected to the adjustable section of said bracket laterally with respect to the carriage.

4. In an apparatus of the character described, a support to engage a piece of work to be welded, a track assembly adjustably mounted on the carriage to have its inclination varied with respect to the work, a carriage including rollers adapted to travel on the track assembly, a bracket secured to the carriage and including an adjustable section, an arm including means for gripping a welding stick and adjustably connected to the adjustable section of said bracket laterally with respect to the carriage, and a stop adjustably mounted on the track assembly for variably limiting the movement of the carriage in the direction of the work.

JOSEPH M. CARTER.